(12) United States Patent
Kuchibhatla

(10) Patent No.: US 10,239,563 B2
(45) Date of Patent: Mar. 26, 2019

(54) INSTRUMENT PANEL TO FRONT COWL ATTACHMENT

(71) Applicant: FORD GLOBAL TECHNOLOGIES, LLC, Dearborn, MI (US)

(72) Inventor: Sreenivas Kuchibhatla, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 42 days.

(21) Appl. No.: 15/340,008

(22) Filed: Nov. 1, 2016

(65) Prior Publication Data

US 2018/0118276 A1    May 3, 2018

(51) Int. Cl.
*B62D 25/08* (2006.01)
*B62D 25/14* (2006.01)

(52) U.S. Cl.
CPC ........ *B62D 25/081* (2013.01); *B60Y 2306/09* (2013.01); *B62D 25/14* (2013.01)

(58) Field of Classification Search
CPC ..... B62D 25/081; B62D 25/082; B62D 25/14
USPC ........................................................ 296/192
See application file for complete search history.

(56) References Cited

U.S. PATENT DOCUMENTS

| | | | |
|---|---|---|---|
| 6,237,956 B1 | 5/2001 | Haba et al. | |
| 6,481,786 B1 | 11/2002 | Kim | |
| 8,308,224 B2 | 11/2012 | Ishii et al. | |
| 8,651,552 B2* | 2/2014 | Shibutake | B62D 25/14 296/192 |
| 8,876,197 B1 | 11/2014 | Kuchibhatla et al. | |
| 2011/0076435 A1* | 3/2011 | Tachibana | B62D 25/081 428/43 |
| 2013/0181482 A1* | 7/2013 | Suzaki | B62D 25/081 296/192 |
| 2016/0082900 A1 | 3/2016 | Saeki | |
| 2017/0158247 A1* | 6/2017 | Hwang | B62D 25/081 |

FOREIGN PATENT DOCUMENTS

| | | | | |
|---|---|---|---|---|
| FR | 2874577 A1 * | 3/2006 | ........... | B62D 25/081 |
| KR | 100570019 B1 | 4/2006 | | |

OTHER PUBLICATIONS

English translation of WO 2006/027508 correspondiong to FR 2874577; retreived Feb. 8, 2018 via PatentTranslate located at www.epo.org. (Year: 2018).*
English Machine Translation of KR100570019B1.

* cited by examiner

*Primary Examiner* — Jason S Daniels
(74) *Attorney, Agent, or Firm* — Vichit Chea; King & Schickli PLLC

(57) ABSTRACT

A stiffening assembly for a vehicle cowl panel includes a pair of cooperating C-shaped brackets. Each of the pair of cooperating C-shaped brackets comprises cooperating bracket arms adapted for holding opposed ends of the pair of cooperating C-shaped brackets at varying distances from one another. Each of the pair of cooperating C-shaped brackets comprises a pair of parallel bracket arms which align with one another when the stiffening assembly is attached to the cowl panel. Cowl panel and instrument panel assemblies incorporating one or more stiffening assemblies and vehicles incorporating the cowl panel and instrument panel assemblies are provided.

18 Claims, 4 Drawing Sheets

INSTRUMENT PANEL TO FRONT COWL ATTACHMENT

TECHNICAL FIELD

This disclosure relates generally to vehicle instrument panel assemblies. In particular, the disclosure relates to strategies for assembling an instrument panel to a vehicle front cowl, and for bracket assemblies for accomplishing same.

BACKGROUND

A vehicle instrument panel is an important component of a vehicle assembly, carrying a variety of essential, useful, and/or desirable elements. For example, the typical instrument panel typically carries or holds such diverse elements as a steering column/wheel, an instrument cluster, an entertainment center, a glove box and/or other dash-mounted storage compartments, navigation systems, built-in cameras, associated electronic modules, and others.

The vehicle instrument panel also serves an important structural function and must meet certain engineering requirements. In particular, for a desirable passenger cabin occupant experience, a primary requirement is for the instrument panel to be as rigid as possible. A suitably rigid instrument panel ensures an acceptable level of noise, vibration, and harshness (NVH), acceptable crash safety performance, and acceptable climate control performance, among others. A higher NVH characteristic translates into an improved user experience from the perspective of a passenger. A lower instrument panel NVH characteristic results in user dissatisfaction.

FIG. 1 shows a portion of a vehicle 100 including a frame 102 defining an engine compartment 104 and a passenger cabin 106, a cowl panel 108 disposed substantially at a juncture of the engine compartment and the passenger cabin, and an instrument panel 110. In many vehicle 100 designs, the instrument panel 110 is attached to a portion of the cowl panel 108.

This is shown in greater detail in FIG. 2, wherein a portion of the instrument panel 110 is attached to a cowl panel 108 defined by a vehicle-forward wall 112, a vehicle-rearward wall 114, and an intervening floor 116. Because of the relative positions of the instrument panel 110 and the cowl panel 108 in an assembled vehicle 100, as shown in FIG. 3 the instrument panel 110 is typically attached to an upper portion of the vehicle-rearward wall 114 of the cowl panel 108 at one or more attachment points 118 (see FIG. 3).

Because of the relatively high attachment points 118 of the instrument panel 110 to the cowl panel vehicle rearward wall 114, particularly if a portion of the vehicle 100 construction such as the cowl panel 108 is of a lesser stiffness a certain amount of vibration and translation (shown generally as arrow A in FIG. 2) of the instrument panel caused by engine- and road-induced vibrations occurs as the vehicle is operated. These vibrations are measurable as cycles/sec. or Hz, and translate to physical movement, bending, and/or torsional responses of the instrument panel 110. This instrument panel 110 "roll" resulting in a pulling effect on the cowl panel vehicle-rearward wall 114 can result in a lowered NVH characteristic for the instrument panel.

Thus, a need is identified in the art for reducing the tendency of an instrument panel 110 attached to a cowl panel 108 to translate and contribute to NVH during vehicle operation.

SUMMARY

In accordance with the purposes and benefits described herein and to solve the above-summarized and other problems, in one aspect of the present disclosure a stiffening assembly for a vehicle cowl panel is provided, comprising a pair of cooperating C-shaped brackets each comprising cooperating bracket arms adapted for holding opposed ends of the pair of cooperating C-shaped brackets at varying distances from one another. In embodiments, each of the pair of cooperating C-shaped brackets comprises parallel bracket arms.

The parallel bracket arms may each be provided with one or more spaced bracket arm through-bores. The parallel bracket arms of each of the pair of cooperating C-shaped brackets are disposed to align with one another when the stiffening assembly is attached to the cowl panel. In embodiments, the pair of cooperating C-shaped brackets each respectively includes a bracket flange provided with one or more spaced flange through-bores configured to allow securing the stiffening assembly to the cowl panel wall.

In another aspect, an instrument panel and cowl panel assembly for a vehicle is provided, comprising a cowl panel, an instrument panel assembly attached to a portion of a vehicle-rearward cowl panel, and one or more stiffening assemblies attached to a portion of the vehicle-rearward cowl panel wall and to a vehicle-forward cowl panel wall. The one or more stiffening assemblies each comprise a pair of cooperating C-shaped brackets each including cooperating bracket arms adapted for holding opposed ends of the pair of cooperating C-shaped brackets at varying distances from one another.

In embodiments, each of the pair of cooperating C-shaped brackets comprises parallel bracket arms provided with one or more spaced bracket arm through-bores. The pair of cooperating C-shaped brackets may further each respectively include a bracket flange provided with one or more spaced flange through-bores. The parallel bracket arms of each of the pair of cooperating C-shaped brackets are disposed to align with one another when the one or more stiffening assemblies are attached to the vehicle-rearward cowl panel wall and to the vehicle-forward cowl panel wall. The one or more spaced flange through-bores are configured to allow securing the one or more stiffening assemblies to the vehicle-rearward cowl panel wall and to the vehicle-forward cowl panel wall.

In yet another aspect, a vehicle is provided, comprising a body defining at least a passenger compartment and a cowl panel defined by at least a vehicle-rearward cowl panel wall and a vehicle-forward cowl panel wall. An instrument panel assembly is attached to a portion of the vehicle-rearward cowl panel. One or more stiffening assemblies are attached to a portion of the vehicle-rearward cowl panel wall and to the vehicle-forward cowl panel wall. The vehicle-rearward cowl panel wall and the vehicle-forward cowl panel wall may be held in a substantially upright orientation.

In embodiments, the one or more stiffening assemblies each comprise a pair of cooperating C-shaped brackets each including cooperating bracket arms adapted for holding opposed ends of the pair of cooperating C-shaped brackets at varying distances from one another. Each of the pair of cooperating C-shaped brackets may comprise parallel bracket arms each provided with one or more spaced bracket arm through-bores. The pair of cooperating C-shaped brackets may further each respectively include a bracket flange provided with one or more spaced flange through-bores.

The parallel bracket arms of each of the pair of cooperating C-shaped brackets are disposed to align with one another when the one or more stiffening assemblies are attached to the vehicle-rearward cowl panel wall and to the vehicle-forward cowl panel wall. The one or more spaced flange through-bores are configured to allow securing the one or more stiffening assemblies to the vehicle-rearward cowl panel wall and to the vehicle-forward cowl panel wall.

In the following description, there are shown and described embodiments of the disclosed cowl panel stiffening assembly. As it should be realized, the described devices are capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the cowl panel stiffening assembly, and together with the description serve to explain certain principles thereof. In the drawings.

Reference will now be made in detail to embodiments of the disclosed cowl panel stiffening assembly, examples of which are illustrated in the accompanying drawing figures.

DETAILED DESCRIPTION

Figure 1:
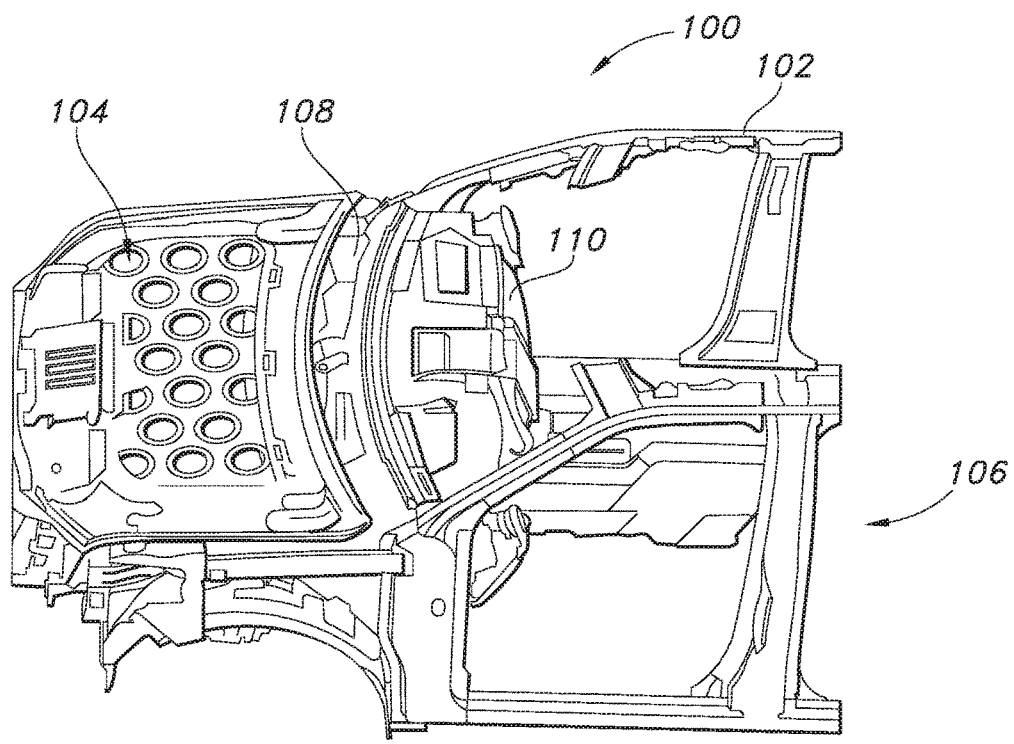
FIG. 1 depicts a perspective view of a prior art vehicle including a cowl panel and an instrument panel secured thereto.
Figure 2:
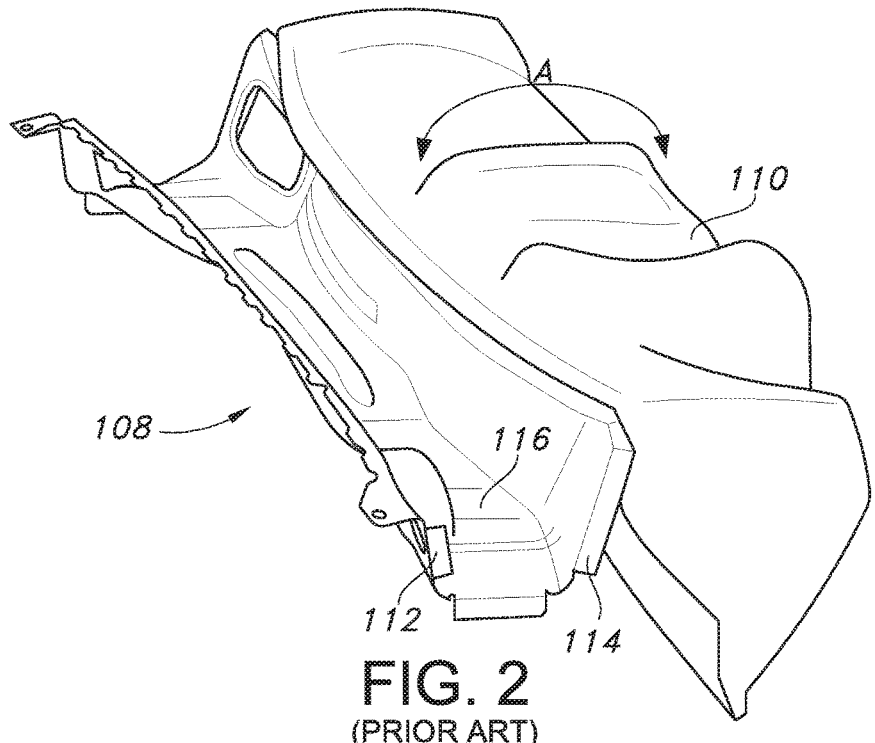
FIG. 2 depicts a cowl panel and instrument panel assembly showing an instrument panel movement allowed by the arrangement shown in FIG. 1.
Figure 3:
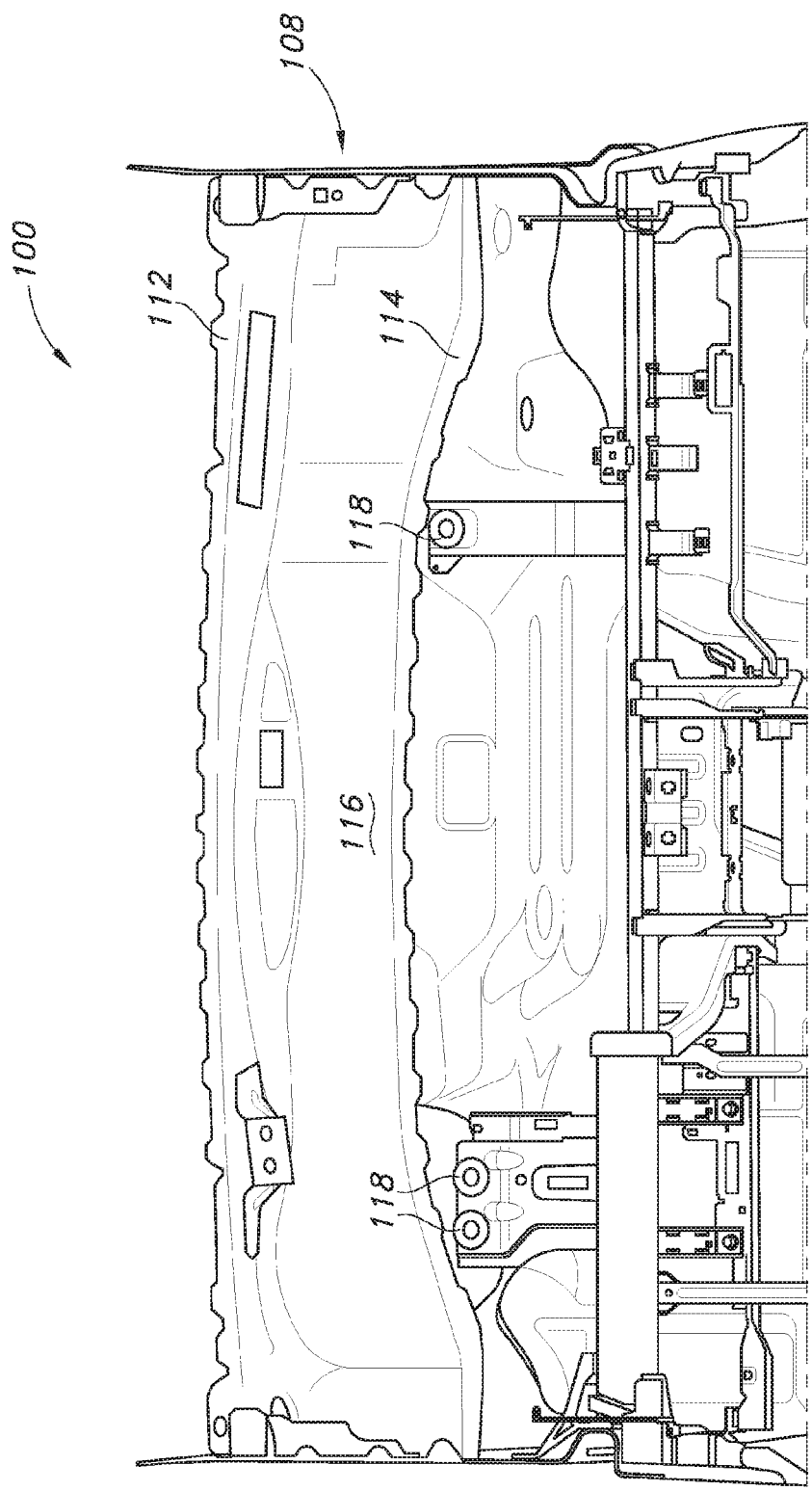
FIG. 3 shows representative attachment points whereby an instrument panel is attached to a cowl panel as shown in FIG. 1.
Figure 4:
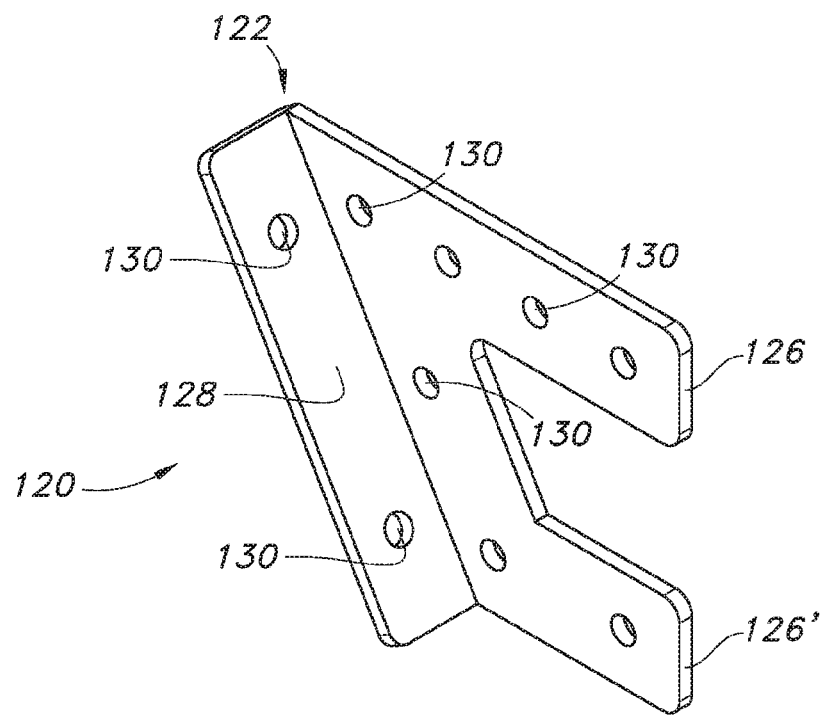
FIG. 4 shows an isometric view of a C-shaped bracket for use in a stiffening assembly according to the present disclosure.
Figure 5:
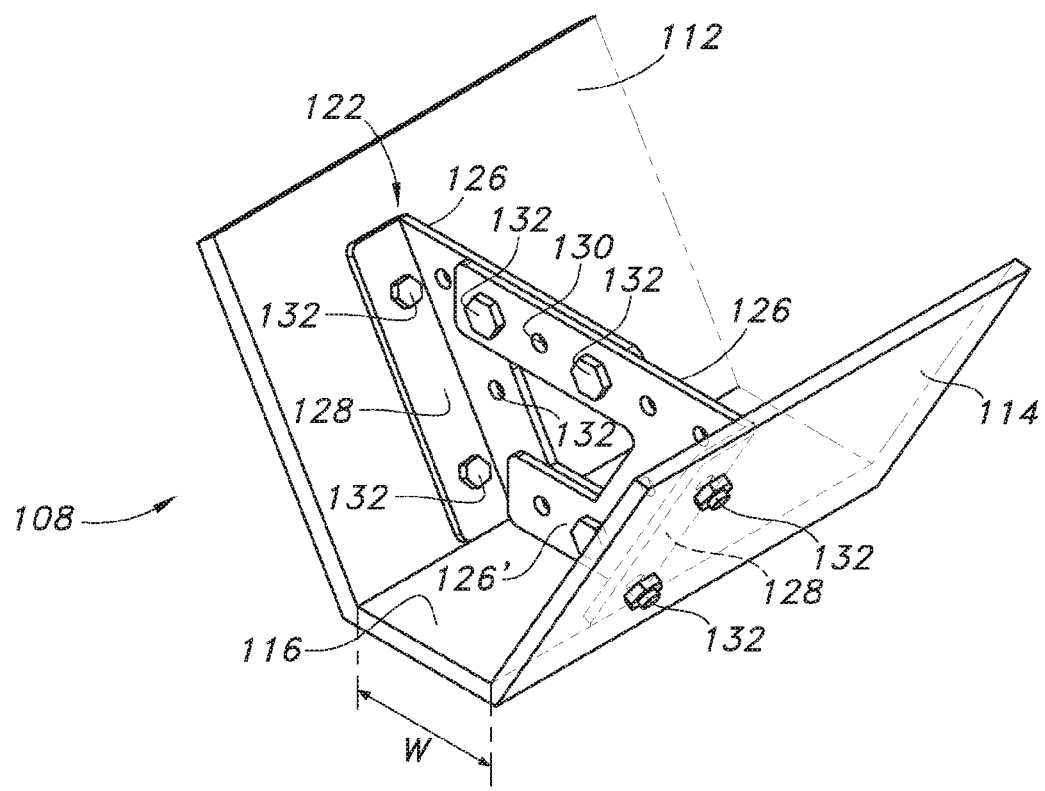
FIG. 5 depicts an isometric view of a cowl panel including a stiffening assembly according to the present disclosure.
Figure 6:
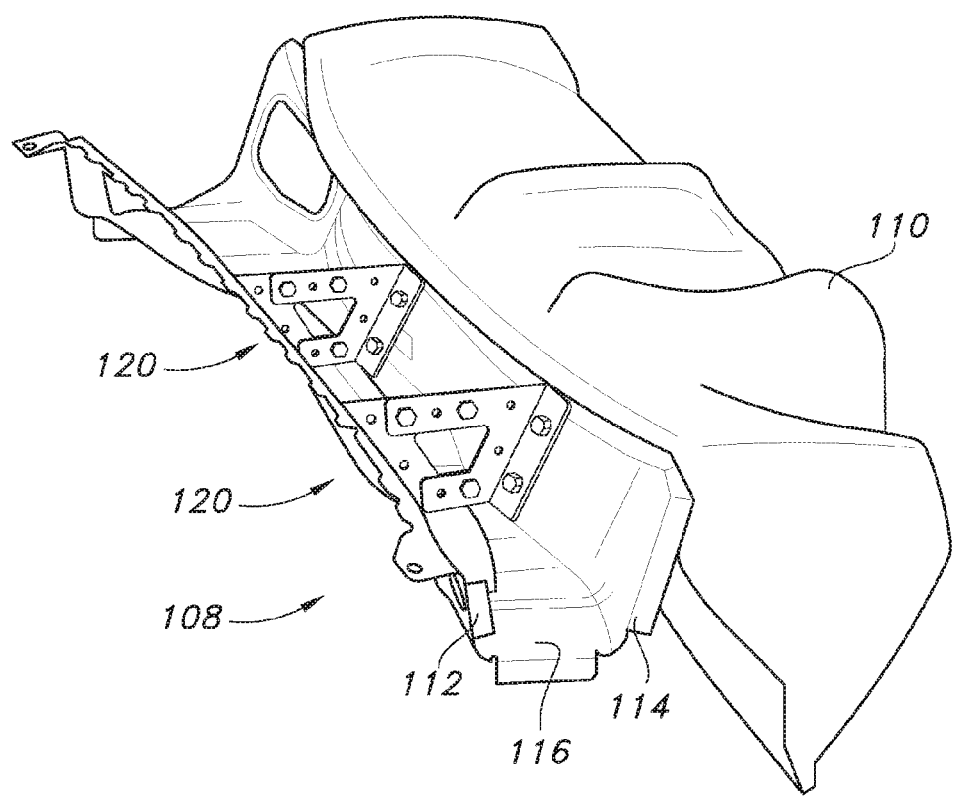
FIG. 6 depicts a cowl panel and instrument panel assembly including a pair of cowl panel stiffening assemblies according to the present disclosure.

With reference to FIGS. 4-6, a cowl panel stiffening assembly 120 is shown which solves the above-described and other problems by reducing the tendency of a cowl panel 108 and an instrument panel 110 attached thereto to translate or deflect in response to engine- and/or road-induced vibrations. The cowl panel stiffening assembly 120 is shown attached to a vehicle-forward wall 112 and a vehicle-rearward wall 114 of the cowl panel 108.

The cowl panel stiffening assembly 120 includes a pair of cooperating C-shaped brackets 122, 124, in the depicted embodiments being mirror images of one another. With reference to FIG. 4 showing C-shaped bracket 122, each C-shaped bracket includes a pair of cooperating bracket arms 126, 126' adapted to hold opposed ends of the pair of cooperating C-shaped brackets 122, 124 at varying distances from one another to provide an adjustable cowl panel stiffening assembly 120 (see FIG. 5, arrow B). Each of the pair of cooperating C-shaped brackets 122, 124 also includes a flange 128 adapted to be attached to a cowl panel 108 wall. While only a single flange 128 is provide in the depicted embodiment of the pair of cooperating C-shaped brackets 122, 124, it will be appreciated that a flange portion (not shown) providing a mirror image to the depicted flange 128 could be provided for a stronger attachment to a cowl panel 108 wall.

This feature of adjustability is implemented by providing one or more spaced through-bores 130 in the cooperating bracket arms 126, 126' and in the flanges 128. These spaced through-bores 130 are dimensioned to receive suitable fasteners 132 therethrough. With reference to FIGS. 5-6, in use the cooperating bracket arms 126, 126' of each of the pair of cooperating C-shaped brackets 122, 124 are aligned and fastened to one another by fasteners 132, selecting the through-bores 130 providing a length of the assembled cowl panel stiffening assembly 120 which will accommodate a width dimension W of the cowl panel 108. As will be appreciated, this feature allows the described cowl panel stiffening assembly 120 to be adapted to fit cowl panels 108 having a range of widths, i.e. distances between vehicle-forward wall 112 and vehicle-rearward wall 114.

As shown in FIG. 6, the described cowl panel stiffening assembly 120 stiffens and stabilizes the cowl panel vehicle-forward wall 112 and vehicle-rearward wall 114, in turn reducing the tendency of the instrument panel 110 to roll. As will be appreciated, one, two, or more cowl panel stiffening assemblies 120 may be attached to the cowl panel vehicle-forward wall 112 and vehicle-rearward wall 114 in accordance with the length and width of the cowl panel 108 and with the tendency of the vehicle-rearward wall 114 to deflect and allow the instrument panel 110 to roll.

As will be appreciated, by use of the described cowl panel stiffening assembly 120, a number of advantages are realized. The described assembly provides a simple, efficient, and cost-effective alternative to solutions based on increasing instrument panel 110 subassembly stiffness/weight. By the described cowl panel stiffening assembly, instrument panel NVH requirements can be met, improving customer acceptance of vehicle incorporating the assembly.

The foregoing has been presented for purposes of illustration and description. It is not intended to be exhaustive or to limit the embodiments to the precise form disclosed. Obvious modifications and variations are possible in light of the above teachings. For example, the foregoing description focused on cowl panel/instrument panel assemblies. However, the skilled artisan will readily appreciate that the described stiffening assembly is readily applicable to any joint attachment scenario wherein a bracket assembly as described can be applied to stiffen a panel or assembly comprising substantially vertical forward and rearward walls. All such modifications and variations are within the scope of the appended claims when interpreted in accordance with the breadth to which they are fairly, legally and equitably entitled.

What is claimed:

1. A stiffening assembly for a vehicle cowl panel, comprising a pair of cooperating C-shaped brackets each comprising cooperating bracket arms adapted for holding opposed ends of the pair of cooperating C-shaped brackets at varying distances from one another.

2. The stiffening assembly of claim 1, wherein each of the pair of cooperating C-shaped brackets comprises parallel bracket arms;

further wherein the parallel bracket arms are each provided with one or more spaced bracket arm through-bores.

3. The stiffening assembly of claim 2, wherein the parallel bracket arms of each of the pair of cooperating C-shaped brackets are disposed to align with one another when the stiffening assembly is attached to the cowl panel.

4. The stiffening assembly of claim 3, wherein the one or more spaced flange through-bores are configured to allow securing the stiffening assembly to opposed walls of the cowl panel.

5. The stiffening assembly of claim 1, further wherein the pair of cooperating C-shaped brackets each respectively includes a bracket flange provided with one or more spaced flange through-bores.

6. A vehicle including the stiffening assembly of claim 1.

7. An instrument panel and cowl panel assembly for a vehicle, comprising:
a cowl panel;
an instrument panel assembly attached to a vehicle-rearward cowl panel wall; and
one or more stiffening assemblies attached to the vehicle-rearward cowl panel wall and to a vehicle-forward cowl panel wall;
wherein the one or more stiffening assemblies each comprise a pair of cooperating C-shaped brackets each including cooperating bracket arms adapted for holding opposed ends of the pair of cooperating C-shaped brackets at varying distances from one another.

8. The instrument panel and cowl panel assembly of claim 7, wherein each of the pair of cooperating C-shaped brackets comprises parallel bracket arms;
further wherein the parallel bracket arms are each provided with one or more spaced bracket arm through-bores.

9. The instrument panel and cowl panel assembly of claim 8, wherein the parallel bracket arms of each of the pair of cooperating C-shaped brackets are disposed to align with one another when the one or more stiffening assemblies are attached to the vehicle-rearward cowl panel wall and to the vehicle-forward cowl panel wall.

10. The instrument panel and cowl panel assembly of claim 9, wherein the one or more spaced flange through-bores are configured to allow securing the one or more stiffening assemblies to the vehicle-rearward cowl panel wall and to the vehicle-forward cowl panel wall.

11. The instrument panel and cowl panel assembly of claim 7, further wherein the pair of cooperating C-shaped brackets each respectively includes a bracket flange provided with one or more spaced flange through-bores.

12. A vehicle including the instrument panel and cowl panel assembly of claim 7.

13. A vehicle, comprising:
a body defining at least a passenger compartment and a cowl panel defined by at least a vehicle-rearward cowl panel wall and a vehicle-forward cowl panel wall;
an instrument panel assembly attached to the vehicle-rearward cowl panel wall; and
one or more stiffening assemblies attached to the vehicle-rearward cowl panel wall and to the vehicle-forward cowl panel wall;
wherein the one or more stiffening assemblies each comprise a pair of cooperating C-shaped brackets each including cooperating bracket arms adapted for holding opposed ends of the pair of cooperating C-shaped brackets at varying distances from one another.

14. The vehicle of claim 13, wherein the vehicle-rearward cowl panel wall and the vehicle-forward cowl panel wall are held in a substantially upright orientation.

15. The vehicle of claim 13, wherein each of the pair of cooperating C-shaped brackets comprises parallel bracket arms;
further wherein the parallel bracket arms are each provided with one or more spaced bracket arm through-bores.

16. The vehicle of claim 15, wherein the parallel bracket arms of each of the pair of cooperating C-shaped brackets are disposed to align with one another when the stiffening assemblies are attached to the vehicle-rearward cowl panel wall and to the vehicle-forward cowl panel wall.

17. The vehicle of claim 13, further wherein the pair of cooperating C-shaped brackets each respectively includes a bracket flange provided with one or more spaced flange through-bores.

18. The vehicle of claim 17, wherein the one or more spaced flange through-bores are configured to allow securing the one or more stiffening assemblies to the vehicle-rearward cowl panel wall and to the vehicle-forward cowl panel wall.

\* \* \* \* \*